United States Patent [19]

Tsukamoto et al.

[11] 4,004,997
[45] Jan. 25, 1977

[54] PROCESS OF CURING A POLYMERIZABLE COMPOSITION CONTAINING A MAGNETIZED POWERED FERROMAGNETIC MATERIAL WITH RADIOACTIVE RAYS

[75] Inventors: Kenkichi Tsukamoto, Fujihara; Yusuke Matsumura, Chigasaki; Ryuichi Sano, Kamakura, all of Japan

[73] Assignees: Seiko Shimada, Tokyo; Teizo Takahashi, Imaichi; Mitso Nishida, Chigasaki, all of Japan

[22] Filed: Jan. 23, 1975

[21] Appl. No.: 543,454

Related U.S. Application Data

[63] Continuation-in-part of Ser. No. 327,639, Jan. 29, 1973, abandoned.

[30] Foreign Application Priority Data

Jan. 30, 1972 Japan ............................ 47-10856

[52] U.S. Cl. .................... 204/159.14; 96/115 R; 96/115 P; 204/159.15; 204/159.19; 204/159.24; 250/492 R; 250/42.22; 260/42.53; 260/42.52; 260/78.41; 260/77.5 CR; 260/835; 260/836; 260/837 R; 260/859 R; 260/863; 526/328; 427/44; 427/463; 428/329; 428/425; 428/458; 428/900

[51] Int. Cl.$^2$ .................... C08F 8/00; C08F 2/46
[58] Field of Search .......... 260/42.22; 204/159.24, 204/159.14, 159.19; 96/115 P, 115 R

[56] References Cited

UNITED STATES PATENTS

| | | | |
|---|---|---|---|
| 3,535,403 | 10/1970 | Holub et al. | 260/837 |
| 3,567,607 | 3/1971 | Saunders et al. | 204/159.2 |

Primary Examiner—Richard B. Turer

[57] ABSTRACT

A process for curing a resin composition for the manufacture of plastic thin films by radiation curing with radioactive rays comprising mixing a radical-polymerizable resin with a filler, characterized in that at least a part of the filler is composed of a powdery ferromagnetic substance and in that said powdery ferromagnetic substance is incorporated in an amount of 1.5 to 998 parts by weight based on 100 parts by weight of the radical-polymerizable resin.

9 Claims, No Drawings

PROCESS OF CURING A POLYMERIZABLE COMPOSITION CONTAINING A MAGNETIZED POWERED FERROMAGNETIC MATERIAL WITH RADIOACTIVE RAYS

This application is a continuation-in-part application of serial No. 327,639 filed Jan. 29, 1973, now abandoned.

This invention relates to a radiation curable resin composition which can be formed into a plastic film by curing with radioactive rays.

In the field of high molecular chemistry, the role of radioactive rays in the production of polymers is well known and the irradiation technique has already been applied to the preparation of plastic films. It is also known that the polymerization occurs rapidly by irradiation and the chemical and physical properties of the resulting plastic film are excellent. In order to utilize radioactive rays effectively in the formation of plastic films, it is necessary to apply radioactive rays uniformly to the film surface and impact radioactive energy uniformly and unwastedly throughout the flim. In some cases, it is effective to apply radioactive rays only to a certain part of the film surface or a certain layer or an inner portion of the film. Owing to the specific properties of the radioactive ray, it is not always easy to apply the energy efficiently to the film uniformly or unevenly. In general, as a radioactive ray passes through a substance, the velocity thereof decreases, and the energy imparted to the substance by the radioactive ray along its path is in inverse proportion to the transit velocity. Therefore, in the case of radioactive rays moving in a straight line, such as X-rays, the absorption of energy is very small in the surface layer of the film, and it increases as the radioactive rays penetrate the film and it reduces beyond a certain depth.

Thus, in the case of such rays, absorption of energy is not uniform but varies depending on the location. Further, in the case of radioactive rays which lose energy by impinging against electrons of the substance and thus continually changing in direction of movement, such as electron rays, the path is random and the energy absorbed in a practical energy-absorption layer, i.e. at an effective penetration depth, is up to 60% of the irradiated energy and the remaining 40% is not effectively utilized. When charged particles of a high energy impinge against a substance, controlling X-rays are secondarily generated. Also X-rays make a contribution to the formation of plastic films, but the major portion thereof is emitted out of the irradiated substance. In addition, ozone formed as a byproduct by action of X-rays on oxygen in the air, corrodes metals. Accordingly, great care must be taken not only to avoid waste of energy but also to prevent the harmful effects of X-rays on the human body and of ozone on metals.

In plastic films having filler incorporated therein, the filler is not affected by the irradiation but it absorbs a substantial proportion of radioactive energy, depending on the amount of incorporated filler and such energy is wasted. In the case that the plastic film does not have a sheet-like form but has a relatively complicated shape, as is very common in the art, it is difficult to apply radioactive rays uniformly. It is also known that, in the case of sheet-like plastic films, it is difficult to impart radioactive energy selectively to the surface only, or to a specific portion or specific layer of the film.

An object of this invention is to eliminate or mitigate the above disadvantages of the conventional techniques resulting from the characteristic properties of radioactive rays in formation of plastic films by radiation curing, thereby to impart radioactive energy uniformly or selectively to plastic films to be formed without wasteful consumption of radioactive energy.

According to the present invention a radiation curable resin composition for irradiation curing as hereinafter defined, comprises at least one radical-polymerizable resin and a filler, the filler being at least partially composed of a magnetized powdery ferromagnetic substance and said powdery ferromagnetic substance being incorporated in an amount of 1.5 to 998 parts by weight per 100 parts by weight of the least one radical-polymerizable resin. By the term "radioactive rays" used in the instant specification are meant high energy rays such as $\alpha$-rays, $\beta$-rays, $\gamma$-rays, X-rays and electron beams. Utilization of electron beams accelerated by a particle accelerator is effective for industrial applications in the process of this invention. Further, the term "resin to be radiation-polymerized or resin of the radiation-polymerizable type" means a monomeric or polymeric organic material which is polymerized to a high molecular weight polymer when it is exposed to high energy rays which cause ionization and excitation and generation of radicals. A typical instance of such resin is a radical-polymerizable resin. As the radicalpolymerizable resin, there may be employed ordinary radiation-curable resins.

Resins having polymerizable unsaturated groups and/or the monomeric compounds having polymerizable unsaturated groups can be used in the resin composition of the invention.

Resins or compounds having polymerizable unsaturated groups which have a number average molecular weight of 300 to 100,000 and a double bond equivalent of 100 to 5,000 may be examplified as follows: [By the expression "double bond equivalent" is meant (the number average molecular weight of the resin or compound)/(the theoretical number of double bonds in a molecule of the resin or compound)].

Unsaturated polyester resins having a number average molecular weight of 500 to 4,000 and a double bond equivalent of 200 to 2,000;

unsaturated acrylic resins having a number average molecular weight of 1,000 to 100,000, and a double bond equivalent of 200 to 5,000 which is introduced by (1) adding equimolar addition product of a diisocyanate as defined below and a polymerizable unsaturated vinyl monomer having hydroxyl group as defined below, or an acid anhydride having a polymerizable unsaturated group as defined below to the resin having hydroxyl groups, or (2) adding an unsaturated monoglycidyl monomer as defined below to the resin having carboxyl groups, unsaturated alkyd resins having a number average molecular weight of 500 to 4,000, and a double bond equivalent of 200 to 2,000 which is introduced by (1) adding equimolar addition product of a diisocyanate and polymerizable unsaturated vinyl monomer having hydroxyl group, or an acid anhydride having polymerizable unsaturated group to the resin having hydroxyl groups, or (2) adding an unsaturated monoglycidyl monomer to the resin having carboxyl groups, a. Diisocyanate:

2,4-tolylene diisocyanate, 2,6-tolylene diisocyanate, 1,6-hexamethylene diisocyanate, 4,4'-diphenylmethane diisocyanate, 4,4'-diphenylether diisocyanate, m-phenylene diisocyanate, 1,5-naphthalene diisocyanate, biphenylene diisocyanate, 3,3'-dimethyl-4,4'-biphenylene diisocyanate, dicyclohexylmethane-4,4'-diisocyanate, p-xylylene diisocyanate, m-xylylene diisocyanate, bis(4-isocyanate phenyl) sulfone, isopropylydene-bis(4-phenylisocyanate) and the like, b. Polymerizable unsaturated vinyl monomers having hydroxyl group:

2-hydroxyethyl methacrylate, 2-hydroxypropyl methacrylate, 2-hydroxyethyl acrylate, 2-hydroxypropyl acrylate, allyl alcohol, methallyl alcohol and the like.

c. Acid anhydrides having polymerizable unsaturated group:

Maleic anhydride, tetrahydrophthalic anhydride and endo-cis-bicyclo-(2,2,1)-5-pentene-2,3-dicarboxylic anhydride (trade name Himic Anhydride manufactured by Hitachi Kasei Kogyo Co,)

d. Unsaturated monoglycidyl monomers:

Glycidyl methacrylate, glycidyl acrylate, allyl glycidyl ether, and the like;

unsaturated polyvinyl compounds, which are prepared by urethanation reaction of polyalcohol and equimolar addition product of diisocyanate and polymerizable unsaturated vinyl monomer having hydroxyl group, having a number average molecular weight of 500 to 3,000 and a double bond equivalent of 250 to 1,500, unsaturated polyvinyl compounds which are prepared by adding polymerizable unsaturated vinyl monomer having carboxyl group to polyepoxy compound through ring-opening esterification, having a number average molecular weight of 400 to 3,000 and a double bond equivalent of 200 to 1,500, unsaturated polyvinyl compounds, which are prepared by adding polymerizable unsaturated vinyl monomer having hydroxyl group or groups to polybasic acid through esterification, having a number average molecular weight of 300 to 3,000 and a double bond equivalent of 100 to 1,500, or a mixture of any of the above or a solution thereof in, and a liquid vinyl monomer, The unsaturated polyester resins to be used in this invention are prepared, for example, by reacting the following acid and polyhydric alcohol, and then reacting the product with a monomer such as styrene, vinyl toluene, acrylic or methacrylic monomer by a conventional procedure.

a. Acid:

Examples of unsaturated dicarboxylic acid are maleic acid, maleic anhydride, fumaric acid, mesaconic acid, citraconic acid, itaconic acid, tetrahydrophthalic acid, tetrahydrophthalic anhydride, etc., which can be used singly or in admixture. Examples of the aromatic dicarboxylic acids and the saturated aliphatic dicarboxylic acids are phthalic acid, phthalic anhydride, isophthalic acids, hexahydrophthalic acid, hexahydrophthalic anhydride, adipic acid, sebasic acid, succinic acid, succinic anhydride, and the like, which can be used alone or in admixture with one another.

b. Polyhydric alcohol:

Examples of the dihydric alcohol are ethylene glycol, propylene glycol, diethylene glycol, butylene glycol, hydrogenated bisphenol A, bisphenol dihydroxypropylether, neopentyl glycol, butane diol, hexane diol, etc., which can be used alone or in admixture. Further, trihydric alcohol includes, for example, glycerin, trimethylol ethane, trimethylol propane, and the like.

The unsaturated alkyd resin to be used in this invention is prepared by reacting the following acid and polyhydric alcohol by a conventional procedure.

a. Acid:

Phthalic anhydride, isophthalic acid, benzoic acid, adipic acid, maleic anhydride, trimellitic anhydride, and the like, which can be used alone or in admixture.

b. Polyhydric alcohol:

Ethylene glycol, diethylene glycol, propylene glycol, glycerine, trimethylolethane, trimethylolpropane, pentaerythritol, sorbitol, and the like, which can be used alone or in admixture.

The polyalcohols to be used in the urethanation reaction include the same polyhydric alcohols as the ones usable in the above unsaturated polyester.

The polyepoxy compounds to be used in this invention are diepoxy compounds, for example, diglycidyl ether of bisphenol A, diglycidyl ether of resolcin, diglycidyl ether of 1,4-butanediol, diglycidyl ether of polypropylene glycol, diglycidyl ether of polyethylene glycol, diglycidyl ester of phthalic acid, diglycidyl ester of maleic acid, bis(3,4-epoxy-6-methyl-cyclohexylmethyl)-adipate, 3,4-epoxy-6-methylcyclohexylmethyl-3,4-epoxy-6-methyl-cyclohexane carboxylate, dicyclopentadiene dioxide, and the like.

The polybasic acids to be used in the preparation of the polyvinyl compound include the same polybasic acids as the ones usable in the above unsaturated polyester and alkyd resins.

The vinyl monomers to be used in this invention include, for instance, the following compounds:

1. styrene and its derivative expressed by the following formula:

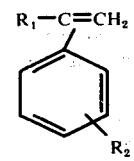

in which $R_1$ is hydrogen or a methyl group and $R_2$ is hydrogen, a methyl group or chlorine, 2. acrylic or methacrylic monomers expressed by the following formula

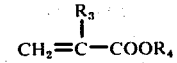

in which $R_3$ is hydrogen or a methyl group and $R_4$ is hydrogen, an alkyl group having 1 to 16 carbon atoms, a hydroxyalkyl group having 2 to 3 carbon atoms, a glycidyl group and a dialkylamino alkyl group

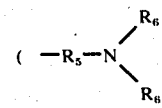

in which $R_5$ is an alkylene group having 1 to 2 carbon atoms and $R_6$ is an alkyl group having 1 to 2 carbon atoms), and 3. vinyl or vinylidene compounds expressed by the following formula

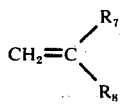

in which $R_7$ is hydrogen or a methyl group and $R_8$ is a nitrile group, carbamoyl group, N-methylolcarbamoyl group, alkylether of N-methylolcarbamoyl group ($-CONHCH_2OR_9$ in which $R_9$ is an alkyl group having 1 to 4 carbon atoms) or acetoxy group.

Examples of vinyl monomers (1) are styrene, vinyl toluene, 2-methyl styrene and chlorostyrene.

Examples of vinyl monomers (2) are acrylic acid, methacrylic acid, methyl acrylate, methyl methacrylate, butyl acrylate, butyl methacrylate, 2-ethylhexyl acrylate, 2-ethylhexyl methacrylate, octyl acrylate, octyl methacrylate, lauryl methacrylate, 2-hydroxyethyl acrylate, 2-hydroxyethyl methacrylate, 2-hydroxypropyl acrylate, 2-hydroxypropyl methacrylate, glycidyl acrylate, glycidyl methacrylate, dimethylaminomethyl acrulate, dimethylaminoethyl methacrylate, diethylaminoethyl acrylate and diethylaminoethyl methacrylate.

Examples of vinyl monomers (3) are acrylonitrile, methacrylonitrile, acrylamide, methacrylamide, ethylether, of N of methylol acrylamide, ethylether-N-methylol methacrylamide, butylether of N-methylol acrylamide, propylether of N-methylol methacrylamide and vinyl acetate. These vinyl monomers may be used singly or in the form of a mixture of two or more of them.

The ratio of the radiation-curable resin and the vinyl monomer may be used as the former of about 90 to 30 parts by weight to the latter of about 70 to 10 parts by weight.

By the term "powdery ferromagnetic substance" is meant a substance which is in powder form and which has ferromagnetic characteristics. Examples of the ferromagnetic substance (the best particle size of ferromagnetic powder is $10\mu$ or less, but this is not necessary to consider so strictly) to be used in this invention are gamma hematite ($\gamma.Fe_2O_3$), magnetite, superfine iron powder, spinel type crystal structure ferrite, magnet-plumbite type crystal structure ferrite, garnet type crystal structure ferrite, perovskite type crystal structure ferrite, inter metallic compound magnet, singular or binary or polynary oxide magnet, nitride magnet, phosphide magnet, carbide magnet, sulfide magnet, etc.

Typical reactions to be utilized for a radical-polymerizable resin which is to form the plastic film include, for example, a cross-linking reaction between an unsaturated polyester and styrene, the polymerization of other vinyl monomers, and the like. The irradiation polymerization can be carried out in either the liquid phase or the solid phase, but in formation of films good results are obtained by conducting the polymerization in the liquid phase. More specifically, intended plastic films can readily be formed by molding or casting the resin to have the prescribed thickness and configuration while the resin is still in the unreacted state and has flowability (this can be readily accomplished because the liquid resin has flowability) and then applying radioactive rays thereto. The resin to be formed into a plastic film may be a single polymer, or it may be in the form of a mixture with a vinyl monomer copolymerizable with the resin, and, if necessary, small amount of an inert solvent, a radical or ion scavenger, a sensitizer, a stabilizer or other additives. A powdery ferromagnetic substance is dispersed as a filler into such unreacted resin or resin composition. In the case that the resin is flowable, the powdery ferromagnetic substance can be thrown into the resin and dispersed therein by means of agitation or kneading. Addition of a dispersing agent is effective. Use of a powdery ferromagnetic substance which is stable both chemically and physically is preferred, and the range of use of a ferromagnetic substance which acts as a catalyst deteriorating the plastics is much limited. Ferromagnetic substances of the iron oxide type are chemically stable, and since they exist in various forms, it is possible to optionally select those which have excellent magnetic characteristics. Accordingly, use of ferromagnetic substances of the iron oxide type is preferred. $\gamma$-hematite, magnetite, various ferrites are relatively easily available and are suitable as the ferromagnetic substances.

In the case that the particle size of the ferromagnetic substance is small, the smoothness and softness of the resulting plastic film are improved, but when the particle size of the ferromagnetic substance is less than a single magnetic domain, it comes to have superparamagnetic characteristics while losing ferromagnetic characteristics. Accordingly, in the practice of this invention, the magnetized powdery ferromagnetic substance is, in many cases, required to have a size exceeding the single magnetic domain. Further, the magnetized powdery ferromagnetic substance has such a property that, when the particle size approximates that of the single magnetic domain, it is self-magnetized. But, for the reasons described below, it is preferred that the powdery ferromagnetic substance be excited before it is dispersed into the resin. Alternatively the excitation is effected after the ferromagnetic substance is dispersed into the resin. The excited powdery magnetic substance forms a magnetic field therearound. In the case of the unreacted resin in which the ferromagnetic substance is uniformly dispersed, magnetic fields are uniformly dispersed in the resin phase. In the case of the resin in which the ferromagnetic substance is unevenly dispersed, the dispersion state of magnetic fields is uneven.

In this invention, by incorporating a powdery ferromagnetic substance into a resin composition, it is possible to obtain a radiation curable resin composition which has the feature that the magnetic field heightens the interfering effect on the radiation.

The powdery ferromagnetic substance is incorporated in an amount of 1.5 to 998 parts by weight per 100 parts by weight of the resin. In the case that the amount of the powdery ferromagnetic substance is lower than 1.5 parts by weight per 100 parts by weight of the resin, the interference effect of the magnetic field on radioactive rays is low. Therefore, use of such a small amount of the ferromagnetic substance is not desired. In the case that the amount of the ferromagnetic substance exceeds 998 parts by weight per 100 parts by weight of the resin, the resulting molded film is brittle and degradation of the film properties is caused. Therefore, use of such a great amount of the ferromagnetic substance is not preferred.

When radioactive rays are applied to a layer of such irradiation-curable resin composition in which magnetic fields are dispersed, in a manner as described above, the resin is promptly polymerized to form a plastic film. It is well known that in a magnetic field radioactive rays are accelerated, refracted or rotated around the line of magnetic force. Radioactive rays penetrating into the plastics film in which magnetic fields are dispersed are caught by the magnetic fields or obstructed by magnetic fluxes, and hence, they are absorbed with difficulty in the powdery ferromagnetic substance incorporated as a filler. Therefore, the majority of incident radioactive rays are utilized for the polymerization of the unreacted resin present in clearances among particles of the ferromagnetic substance, and the polymerization can be accomplished uniformly or non-uniformly depending on the dispersion state of the ferromagnetic substance particles. Accordingly, plastic films obtained according to the process of this invention are excellent over conventional products with respect to film characteristics resulting from the incorporation of a powdery ferromagnetic substance, such as in film hardness and abrasion resistance of the film coating.

The viscosity of the resin composition used in the present invention may be controlled by varying the molecular weight of the resin or resins, the rate of the resin component or the rate of the monomer component, or by a combination of these variations.

The abbreviation "Mrad" used in the following examples means 1,000,000 rad. The term "rad" means the dose of radioactive rays absorbed when there is given the energy of 100 erg per 1g of the substance (for example, the plastic film) by application of the radioactive rays.

EXAMPLE 1

A mixture of 40 parts by weight of trimethylol propane triacrylate, 30 parts by weight of 2-hydroxyethyl methacrylate and 30 parts of a filler was kneaded by means of a roll mill to form two flowable plastics compositions. In one of them, a powder of barium ferrite, which is a ferromagnetic substance, was used as the filler according to this invention. In the comparative composition, a powder of titanium dioxide was used as the filler. Properties of these fillers are as follows:

Powdery barium ferrite:
　magnetized or excited "BF-G" (trademark for a product manufactured by Toda Kogyo) having a composition of 83.22% of $Fe_2O_3$ and 14.41% of BaO, the $Fe_2O_3$/BaO ratio being 5.54, and having a compression density of 3.23 and a Baline diameter of 1.47.

Powdery titanium dioxide:
　a product of the rutile type manufactured by Sakai Chemicals.

Each of these compositions was applied to a smooth steel plate to form a film of a thickness of about 30μ, and the irradiation was carried out under the following conditions by means of an electron beam emitter.
　Voltage : 295 KV
　Current: 1 mA
　Distance between irradiation source and irradiated substance: 25 cm
　Atmosphere: helium
　Radiation velocity: 6.5 cm/sec
　Total dose: 2.5 Mrad As a result of the irradiation, the composition comprising the powdery barium ferrite as the filler was cured and formed into a plastic film having a pencil hardness of grade 3H, but in the case of the composition, comprising titanium dioxide as the filler, a plastic film was formed, whose pencil hardness was lower than grade B.

EXAMPLE 2

A composition obtained by mixing uniformly 40 parts by weight of an unsaturated acrylic resin [This acrylic resin has a number average molecular weight of about 20000 and obtained by polymerizing a monomer mixture of styrene (30 wt parts), methyl methacrylate (15 wt parts), nbutyl acrylate (30 wt parts) and hydromethyl methacrylate (15 wt parts), and then forming an adduct with an equivalent amount of tolylene diisocyanate based on the hydroxymethyl methacrylate used amount.], 5.5 parts by weight of styrene, 22.1 parts by weight of methyl methacrylate, 11.4 parts by weight of Indian red, and 21 parts by weight of magnetized magnetite powder ($Fe_3O_4$; saturation magnetization = 6,000 gauss; average particle size = 0.61μ) was applied to a thickness of about 50μ on a flat plywood board having a thickness of 4 mm, and radioactive rays were applied to the coated composition under the following conditions by means of an electron beam emitter to form a plastic film.
　Voltage: 295 KV
　Current: 1 mA
　Distance between irradiation source and irradiated substance: 25 cm
　Atmosphere: air
　Irradiation velocity: 3.2, 1.6 or 8 cm/sec.
　Total dose: 2.5, 5 or 10 Mrad Films formed by irradiation in total doses of 2.5, 5 and 10 Mrad had pencil hardness values of grade H, 2H and 4H, respectively.

When the composition formed by replacing the magnetite powder in the above composition with Indian red was treated in the same manner as described above, at a total dose of 2.5 Mrad the plastic film was soft, and at total doses of 5 and 10 Mrad, cured films were obtained but their pencil hardness values were softer than grade H and grade H, respectively.

Example 3

The composition of Example 1 containing the barium ferrite as the filler was applied to a thickness of 10μ on a flat steel plate, and the composition of Example 1 containing titanium dioxide as the filler was applied to a thickness of about 20μ on the coating of the above composition, to form a composite film having a total thickness of about 30μ. Then, radioactive rays were applied to the composite film under the following conditions by means of an electron beam emitter.
　Voltage: 260 KV
　Current: 1 mA
　Distance between irradiation source and irradiated substance: 25 cm
　Atmosphere: helium
　Irradiation velocity: 1.6 cm/sec.
　Total dose: 5 Mrad As a result of the irradiation, a hard plastic film was formed, and the pencil hardness of the film as a whole was grade H while the surface layer was relatively soft and the lower layer was relatively hard.

EXAMPLE 4

Compositions of Example 1 containing the powdery barium ferrite as the filler were formed into two cured films by application of radioactive rays in the same manner as in Example 1 except that the amounts of the barium ferrite were less than 1.5 part by weight and more than 998 parts by weight per 100 parts by weight of the radical-polymerizable resin in the respective films. The former film had no significant difference compared with a film prepared under the same conditions by employing titanium dioxide as the filler, and the latter film was very brittle and the other properties thereof were very inferior.

EXAMPLE 5

By using a composition obtained by mixing uniformly 50 parts by weight of an unsaturated polyester resin, which was obtained by reacting 0.5 mol of maleic anhydride (44g), 0.5 mol of tetrahydrophthalic acid (85g) and 1.1 mol of ethylene glycol (68g), 20 parts by weight of styrene and 30 parts of a powder of barium ferrite or a powder of titanium dioxide, the procedure as described in Example 1 was repeated.

As a result of the irradiation carried out by means of an electron beam emitter, the composition containing the powdery barium ferrite was confirmed to have a good magnetic interference effect as described in Example 1.

EXAMPLE 6

By using 50 parts by weight of the unsaturated polyester resin, which was obtained by reacting 0.5 mol of maleic anhydride (44g), 0.5 mol of hexahydrophthalic acid (86g), 0.6 mol of trimethylol ethane (72g) and 0.5 mol of ethylene glycol (31g), in place of the one in Example 5, the procedure as described in Example 1 was repeated.

As a result of the irradiation carried out by means of an electron beam emitter, the composition containing the powdery barium ferrite was confirmed to have a good magnetic interference effect as described in Example 1.

EXAMPLE 7

By using 70 parts by weight of the unsaturated alkyd resin as a polymerizable composition, which was obtained by reacting 2 mol of isophthalic acid (332g), 1 mol of propylene glycol (76g) and 0.6 mol of glycidyl methacrylate (85g), the procedure as described in Example 1 was repeated.

As a result of the irradiation carried out by means of an electron beam emitter, the composition containing the powdery barium ferrite was confirmed to have a good magnetic interference effect as described in Example 1.

EXAMPLE 8

The procedure as described in Example 1 was repeated by using 70 parts by weight of the unsaturated acrylic resin. The resin was obtained by polymerizing 1.2 mol of isophthalic acid (199g), 0.6 mol of adipic acid (88g), 0.8 mol of neopentyl glycol (84g) and 1.2 mol of trimethylol propane (164g) and then adducting 104g of an adduct of 1 mol of 2,4-tolylene diisocyanate and 1 mol of 2-hydroxyethyl methacrylate to 460g of the resulting product.

As a result of the irradiation, the composition containing the powdery barium ferrite was confirmed to have a good magnetic interference effect as described in Example 1.

EXAMPLE 9

The procedure as described in Example 1 was repeated by using 70 parts by weight of the unsaturated acrylic resin. The resin was prepared by polymerizing 0.4 mol of butyl acrylate (51g), 0.4 mol of methyl methacrylate (40g) and 0.2 mol of acrylic acid (14g), and then reacting 100g of the resulting product with 15g of glycidyl methacrylate.

As a result of the irradiation carried out by means of an electron beam emitter, the composition containing the powdery barium ferrite was confirmed to have a good magnetic interference effect as described in Example 1.

EXAMPLE 10

The procedure as described in Example 1 was repeated by using 70 parts by weight of the unsaturated polyvinyl compound. The compound was prepared by reacting 425g of polyethylene glycol having molecular weight of about 425 with 608g of an equivalent adduct of 2,4-tolylene diisocyanate and 2-hydroxyethyl methacrylate.

As a result of the irradiation carried out by means of an electron beam emitter, the composition containing the powdery barium ferrite was confirmed to have a good magnetic interference effect as described in Example 1.

EXAMPLE 11

The procedure as described in Example 1 was repeated by using 70 parts by weight of the polyvinyl compound. The compound was prepared by reacting 2 mol of methacrylic acid (172g) and 1 mol of diglycidyl ether of polypropylene glycol (537g).

As a result of the irradiation carried out by means of an electron beam emitter, the composition containing the powdery barium ferrite was confirmed to have a good magnetic interference effect as described in Example 1.

EXAMPLE 12

The procedure as described in Example 1 was repeated by using 70 parts by weight of a polyvinyl compound. The compound was prepared by reacting 2 mol of 2-hydroxylpropyl acrylate (260g) and 1 mol of phthalic acid (166g).

As a result of the irradiation carried out by means of an electron beam emitter, the composition containing the powdery barium ferrite was confirmed to have a good magnetic interference effect as described in Example 1.

The following Table I shows data on the physical constant of the ferromagnetic substances used in the above examples.

Table I

| Kind of ferromagnetic substance | Lattice Constant A | Value of Magnetic saturation (20° C) | | | Anistotropic constant $K_1$ (ergs/cm$^3$) | X-ray density g/cm$^3$ |
|---|---|---|---|---|---|---|
| | | $\sigma$ Gauss cm$^3$/g | Ms Gauss | $4\pi$ Ms Gauss | | |
| $BaO \cdot 6Fe_2O_3$ | a = 5.88 c = 2.32 | 72 | 380 | 4775 | $3000 \times 10^3$ (20° C) | 5.28 |

Table I-continued

| Kind of ferromagnetic substance | Lattice Constant A | Value of Magnetic saturation (20° C) | | | Anisotropic constant $K_1$ (ergs/cm³) | X-ray density g/cm³ |
|---|---|---|---|---|---|---|
| | | σ Gauss cm³/g | Ms Gauss | 4π Ms Gauss | | |
| $Fe_3O_4$ | a = 8.39 | 92 | 480 | 6000 | $-180 \times 10^3 (20° C)$ | 5.24 |

In addition, various ferromagnetic substances may be used in this invention as mentioned above. The substances are not restricted to only $BaO \cdot 6Fe_2O_3$ and $Fe_3O_4$. The typical ferromagnetic substances to be used in this invention and the physical constants thereof are given in Table II.

Table II

| Kind of ferromagnetic Substance | Lattice constant A | Value of magnetic Saturation (20° C) | | | Anisotropic constant $K_1$ (ergs/cm³) | X-ray density g/cm³ |
|---|---|---|---|---|---|---|
| | | σ Gauss cm³/g | Ms Gauss | 4π Ms Gauss | | |
| $MnFe_2O_4$ | a = 8.50 | 80 | 400 | 5000 | $-28 \times 10^3 (20° C)$ $-187 \times 10^3 (-196° C)$ | 5.00 |
| $CoFe_2O_4$ | a = 8.38 | 80 | 425 | 5300 | $+0.9 \times 10^6 (90° C)$ $+66 \times 10^3 (200° C)$ $\cong 0 (280° C)$ | 5.29 |
| $NiFe_2O_4$ | a = 8.34 | 50 | 270 | 3400 | $-87 \times 10^3 (196° C)$ $-62 \times 10^3 (20° C)$ | 5.38 |
| $CuFe_2O_4$ | a = 8.22 c = 8.70 | 25 | 135 | 1700 | $-206 \times 10^3 (-196° C)$ $-60 \times 10^3 (20° C)$ $-1 \times 10^3 (400° C)$ | 5.35 |
| $ZnFe_2O_4$ | a = 8.44 | — | — | — | — | 5.33 |
| $MgFe_2O_4$ | a = 8.36 | 27 | 120 | 1500 | $-25 \times 10^3 (20° C)$ | 4.52 |
| $Li_{0.5}Fe_{2.5}O_4$ | a = 8.33 | 65 | 310 | 3900 | — | 4.75 |

We claim:

1. A process of curing a composition comprising the step of mixing at least one polymerizable ethylenically unsaturated composition selected from the group consisting of polymerizable resins having ethylenically unsaturated groups therein and ethylenically compounds and a filler comprising a magnetized powdery ferromagnetic substance in an amount of 1.5 to 998 parts by weight based on 100 parts by weight of the at least one polymerizable composition and then curing the mixture with radioactive rays selected from the group consisting of α-rays, β-rays, γ-rays, X rays and electron beams in an amount of from 2.5 to 10 Mrads.

2. A process of claim 1, wherein said polymerizable resin having unsaturated groups is selected from the group consisting of acrylic resins and alkyd resins.

3. A process of claim 1, wherein said ferromagnetic substance is selected from the group consisting of gamma hematite, magnetite, superfine iron powder, spinel type crystalline ferrite, magnet-plumbite type crystalline ferrite, garnet type crystalline ferrite, perovskite type crystalline ferrite, and inter-metallic compound magnets.

4. A process of claim 1, wherein said polymerizable resin is an unsaturated polyester resin has a number average molecular weight of 500 to 4,000 and a double bond equivalent of 200 to 2,000.

5. A process of claim 2, wherein said unsaturated acrylic resin has a number average molecular weight of 1,000 to 100,000 and a double bond eqivalent which is introduced by adding polymerizable unsaturated monomer to the resin, of 200 to 5,000.

6. A process of claim 2, wherein said unsaturated alkyd resin has a number average molecular weight of 500 to 4,000 and a double bond equivalent which is introduced by adding polymerizable unsaturated monomer to the resin, of 200 to 2,000.

7. A process of claim 1 wherein said polymerizable compound is an unsaturated polyvinyl compound and is a urethanation reaction product of a polyalcohol and the equimolar addition product of diisocyanate and vinyl monomer having hydroxyl groups and having a number average molecular weight of 500 to 3,000 and a double bond equivalent of 250 to 1,500.

8. A process of claim 1 wherein said polymerizable compound is an unsaturated polyvinyl compound and is a reaction product of a vinyl monomer having carboxyl groups and a polyepoxy compound through ring-opening esterification and having a number average molecular weight of 400 to 3,000 and a double bond equivalent of 200 to 1,500.

9. A process of claim 1 wherein said polymerizable compound is an unsaturated polyvinyl compound and is a reaction product of a vinyl monomer having a hydroxyl group or group and a polybasic acid through esterification and having a number average molecular weight of 300 to 3,000 and a double bond equivalent of 100 to 1,500.

* * * * *